Oct. 11, 1966 H. L. FOX ETAL 3,277,913
PURE FLUID APPARATUS UTILIZING TRIGGERABLE FLIP-FLOP
Filed Oct. 31, 1963
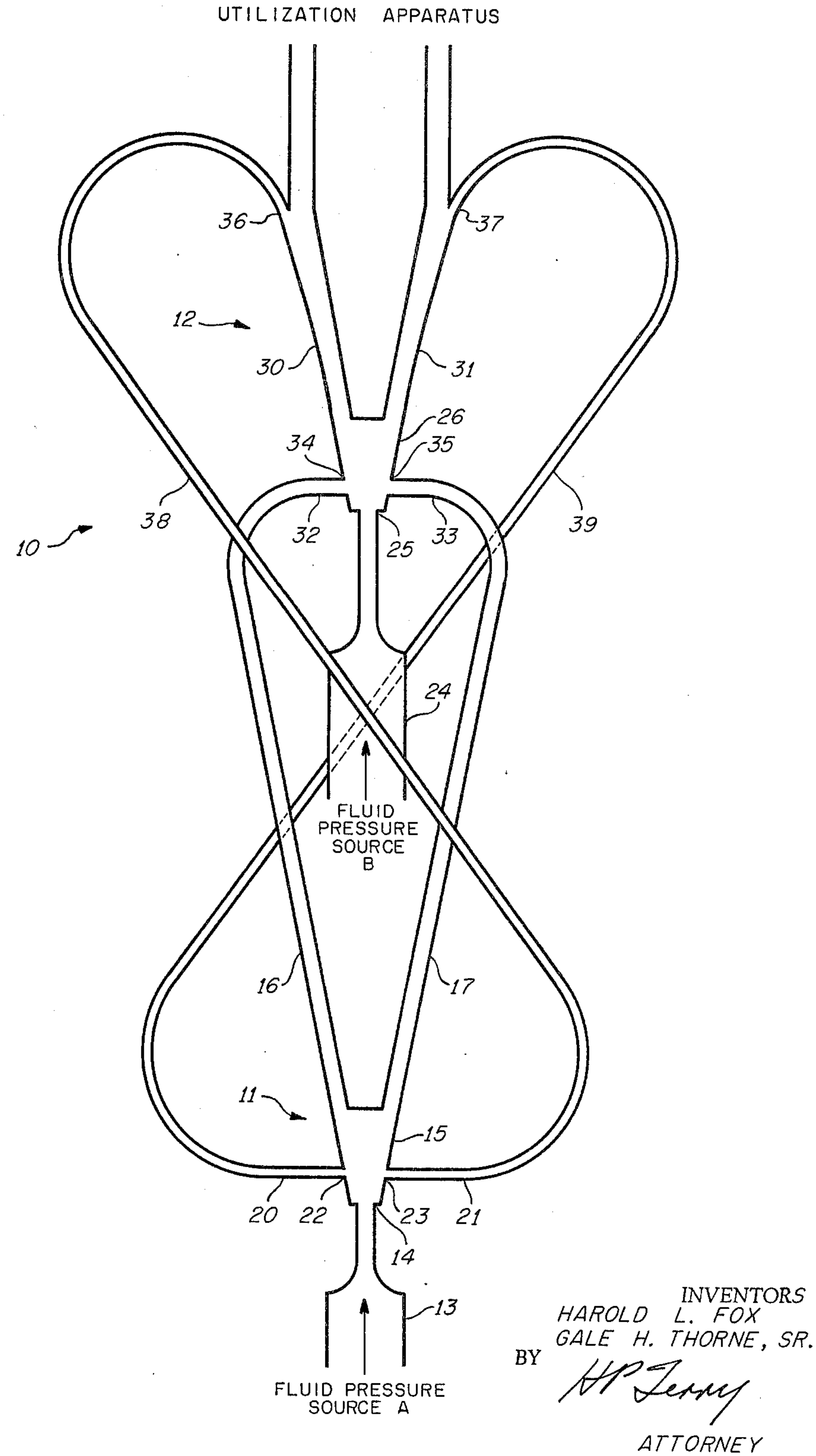
INVENTORS
HAROLD L. FOX
GALE H. THORNE, SR.
BY [signature]
ATTORNEY United States Patent Office 3,277,913
Patented Oct. 11, 1966

3,277,913

PURE FLUID APPARATUS UTILIZING TRIGGERABLE FLIP-FLOP

Harold Lavar Fox and Gale H. Thorne, Sr., Salt Lake City, Utah, assignors to Sperry Rand Corporation, Great Neck, N.Y., a corporation of Delaware
Filed Oct. 31, 1963, Ser. No. 320,290
3 Claims. (Cl. 137—81.5)

The present invention relates to fluid control apparatus and particularly to fluid logic devices of the type suitable for use in fluid digital computer systems.

The problem of making a digital counter, partial sum or partical difference of digital functions is simplified if a triggerable flip-flop is available. The present invention provides a pure fluid triggerable flip-flop suitable for this purpose. The fluid logic apparatus of the present invention may also be utilized as an oscillator.

Prior digital computers utilized logic elements that were either electrically or mechanically operated. The electronic elements suffered from the disadvantages of being relatively delicate, sensitive to environmental conditions and relatively expensive while the equivalent mechanical elements included moving parts having high inertia characteristics and consequent slow reaction time and they tended to be susceptible to malfunctions.

It is therefore a primary object of the present invention to provide fluid logic apparatus for controlling fluid flow without utilizing moving parts.

It is a further object of the present invention to provide fluid logic apparatus which produces logic function that is relatively insensitive to enviromental conditions and is extremely reliable.

It is another object of the present invention to provide a simple pure fluid logic apparatus of the triggerable flip-flop type.

The above objects are achieved by fluid logic apparatus utilizing first and second bistable fluid logic elements in which each element has a primary input channel, control signal channels and output channels. The first element has its output channels connected to the control signal channels of the second element while the second element has a portion of its output connected to the control signal channels of the first element in order that the output from the second element may be sequentially switched from one condition to another.

These and other objects of the present invention will become apparent by referring to the drawing which is a schematic diagram of a pure fluid logic device incorporating the present invention.

Referring to the drawing, the pure fluid logic device 10 of the present invention includes first and second pure fluid bistable elements 11 and 12, respectively. The bistable elements 11 and 12 may, for example, be made from a plurality of flat plates as disclosed in U.S. Patent Numbers 3,001,698 and 3,030,979, although other constructions in the art are suitable for practicing the present invention. In said patents, the desired channel configuration is cut, etched, stamped, or otherwise formed in one of the plates. Since this construction is well known in the art, the drawing shows only the channel configurations which define the paths of fluid flow for the present invention. It will be appreciated that the term "channel" as used herein refers to conduits, pipes, tubes, closed ducts, or other closed passageways for conveying fluid, and the term "orifice" includes restricted or unrestricted openings.

The bistable element 11 has a pulsed or continuous power stream input channel 13 terminating at an orifice 14 in the upstream wall of a chamber 15 formed by the intersection of first and second diverging output channels 16 and 17. The other end of the input channel 13 is connected to a fluid pressure source A as indicated by the legend to provide a source of power stream pulses or a continuous power stream in a manner to be more fully explained. The orifice 14 of the input channel 13 defines a path of pulsed or continuous power stream fluid flow. The element 11 further includes first and second opposed control stream input channels 20 and 21 which terminate in orifices 22 and 23, respectively, in the chamber 15. The orifices 22 and 23 define respective spaced paths of control stream fluid flow that are opposed with respect to each other and cooperative with the fluid flow emanating from the orifice 14.

The output channels 16 and 17 are arranged symmetrically with respect to the fluid flow emanating from the orifice 14 in order that in the absence of any control stream flow from either of the orifices 22 or 23, the power stream fluid arbitrarily flows through one of the output channels 16 or 17 and is not arranged to flow through any particular one of them.

Similarly, the bistable element 12 has a power stream input channel 24 terminating at an orifice 25 in the upstream wall of a chamber 26 formed by the intersection of first and second diverging output channels 30 and 31. The other end of the power stream input channel 24 is connected to a fluid pressure source B as indicated by the legend to provide a continuous power stream. The orifice 25 of the input channel 24 defines a path of power stream fluid flow. The element 12 further includes first and second opposed control stream input channels 32 and 33 which terminate in orifices 34 and 35, respectively, in the chamber 26. The orifices 34 and 35 define respective spaced paths of control stream fluid flow that are opposed with respect to each other and are cooperative with the power stream emanating from the orifice 25.

The output channels 30 and 31 are arranged symmetrically with respect to the power stream emanating from the orifice 25 in order that in the absence of any control stream flow from either of the orifices 34 or 35, the power stream fluid arbitrarily flows through one of the output channels 30 or 31 and is not arranged to flow through any particular one of them.

The output channels 16 and 17 of the element 11 are connected to the control stream input channels 32 and 33, respectively, of the element 12. The element 12 includes a flow divider 36 in its output channel 30 in order that a portion of the fluid flowing through the output channel 30 is diverted through the divider 36 which is connected by a feedback channel 38 to the control stream input channel 21 of the element 11. Similarly, a portion of the flow through the output channel 31 is diverted through a flow divider 37 which is connected by a feedback channel 39 to the control stream input channel 20 of the element 11. The output channels 30 and 31 have extensions downstream from the respective flow dividers 36 and 37 that are connected to utilization apparatus as indicated by the legend.

With the apparatus 10 utilized as a triggerable flip-flop, the fluid pressure source A provides a source of fluid pulses while the fluid pressure source B provides a continuous flow of fluid. With the fluid pressure source B providing a continuous flow of power stream through the orifice 25, the fluid will flow out arbitrarily through either one of the output channels 30 or 31 during the initial operation. Once the power stream attaches to a wall, the well-known Coanda effect provides a stable dynamically formed and sustained pressure gradient across the power stream within the chamber 26 which keeps the power stream affixed to the wall in the absence of any control stream flow. Assuming that the fluid is flowing through the output duct 30, a small fraction is therefore diverted into the feedback duct 38 by the flow divider 36 while the remainder flows out the extension of the output duct 30. The flow through the feedback duct 38 is directed through the orifice 23 into the interaction region of the chamber 15 by means of the control stream input channel 21.

In this mode of operation, the fluid pressure source A provides fluid pulses through the orifice 14 by means of the input channel 13. The input fluid pulses are such that little or no flow occurs through the input channel 13 until the fluid pulse arrives. The fluid pulse will rise from a near zero flow value to its maximum within some small finite period of time. The bistable element 11 is arranged such that during the rise time of the fluid pulse, the small amount of flow from the orifice 23 will be sufficient to cause the incoming fluid pulse to be directed out the output channel 16. As the fluid pulse from the orifice 14 rises to its maximum value, the fluid flow through the output channel 16 into the control stream input channel 32 provides a control stream emanating from the orifice 34 into the interaction region of the chamber 26 which is sufficient to deflect the power stream emanating from the orifice 25 to switch from the output channel 30 to the ouput channel 31.

This results in a fluid flow output from the extension of the output channel 31 into the utilization apparatus and also a portion of the flow is diverted by the flow divider 37 to flow through the feedback channel 39 into the control stream input channel 20 to emanate from the orifice 22 as a control stream in the interaction region of the chamber 15 of the element 11. However, the small amount of feedback flow which emanates from the orifice 22 is not sufficient to switch the power stream flow from the output channel 16 to the output channel 17 when the fluid pulse from the orifice 14 is at its maximum value. Therefore, during the duration of this pulse, the power stream emanating from the orifice 25 continues to flow through the output channel 31 into the utilization apparatus. When this pulse is dissipated, the fluid will continue to flow through the output channel 31 due to the Coanda effect explained above.

When the next pulse occurs from the fluid pressure source A, the control stream emanating from the orifice 22 will be sufficient to switch the flow from the output channel 16 to the output channel 17 during the rise time of the pulse. This results in a control stream emanating from the orifice 35 which causes the power stream emanating from the orifice 25 to be switched from the output channel 31 to flow through the output channel 30 and into the utilization apparatus. Again, a portion is divided into the feedback channel 38 by means of the flow divider 36 and the sequence of operation is repeated in a similar fashion. Subsequent fluid pulses will switch the output of the element 12 in the manner explained above.

When it is desired to utilize the device 10 as an oscillator the fluid pressure source A provides a continuous source of power fluid. In this embodiment, the control stream emanating from the orifices 22 and 23 must be made sufficiently powerful by permitting more fluid to be diverted by the fluid dividers 36 and 37 to cause the element 11 to switch at full power. Then, depending upon the desired switching characteristics, an oscillator can be designed to have a switching rate which is a function of the switching characteristics of each of the elements 11 and 12 and the feedback fluid flow duration.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A pure fluid logic device comprising, (a) first and second bistable fluid logic elements, (b) each of said elements having a power stream stream source for defining a continuous power stream source for defining a continuous power stream, first and second control stream input channels for defining first and second control stream flows respectively cooperative with said power stream, first and second output channels each defining a path of fluid flow, and a chamber formed by the intersection of said input and output channels, whereby said power stream may flow through either of said output channels in the absence of a control stream, (c) at least a portion of said first and second output channels of said first element being connected respectively to said first and second control stream input channels of said second element, and (d) first and second feedback channels connected in opposite sense from said first and second output channels of said second element to said first and second control stream input channels of said first element, respectively, in a manner to tend to cause said power stream of said first element to be deflected towards the output channel of said first element through which the least fluid is flowing.

2. A pure fluid logic device comprising, (a) first and second bistable fluid logic elements, (b) said first element having a first power stream input channel connected to a pulsed power stream source for providing a pulsed power stream, first and second control stream input channels for providing first and second control stream flows respectively cooperative with said pulsed power stream, first and second output channels each defining a path of fluid flow, and a first chamber formed by the intersection of said input and output channels, whereby said power stream may flow through either of said output channels in the absence of a control stream, (c) said second element having a second power stream input channel connected to a continuous power stream source for providing a continuous power stream, third and fourth control stream input channels connected to said first and second output channels of said first element for providing third and fourth control stream flows respectively cooperative with said continuous power stream, third and fourth output channels, and a second chamber formed by the intersection of said input and output channels of said second element, and (d) first and second flow dividing feedback channels connected in opposite sense from said third and fourth output channels of said second element to said first and second control stream input channels of said first element, respectively, in a manner to tend to cause said power stream of said first element to be deflected towards the output channel of said first element through which the least fluid is flowing.

3. A device of the character described in claim 2 in which said first and second flow dividing feedback channels provide sufficient control stream fluid to control said pulsed power stream only during the rise time of the pulses.

References Cited by the Examiner

UNITED STATES PATENTS

| | | | |
|---|---|---|---|
| 3,093,306 | 1/1963 | Warren | 137—81.5 X |
| 3,098,504 | 7/1963 | Joesting. | |
| 3,124,999 | 3/1964 | Woodward. | |
| 3,223,101 | 12/1965 | Bowles | 137—81.5 |

FOREIGN PATENTS

| | | |
|---|---|---|
| 1,278,781 | 11/1961 | France. |

OTHER REFERENCES

"The Amateur Scientist," C. L. Stong, Scientific American, vol. 207, No. 2, August 1962.

M. CARY NELSON, *Primary Examiner.*

S. SCOTT, *Assistant Examiner.*